United States Patent
Narasimha et al.

(10) Patent No.: US 10,162,916 B1
(45) Date of Patent: Dec. 25, 2018

(54) TIMING VERIFICATION IN A PROGRAMMABLE CIRCUIT DESIGN USING VARIATION FACTORS

(71) Applicant: Xilinx, Inc., San Jose, CA (US)

(72) Inventors: Usha Narasimha, Plano, TX (US); Atul Srinivasan, Woodside, CA (US); Nagaraj Savithri, Richardson, TX (US)

(73) Assignee: XILINX, INC., San Jose, CA (US)

( * ) Notice: Subject to any disclaimer, the term of this patent is extended or adjusted under 35 U.S.C. 154(b) by 11 days.

(21) Appl. No.: 15/433,766

(22) Filed: Feb. 15, 2017

(51) Int. Cl.
*G06F 17/50* (2006.01)
*G06F 17/11* (2006.01)

(52) U.S. Cl.
CPC ......... *G06F 17/5031* (2013.01); *G06F 17/11* (2013.01); *G06F 17/5036* (2013.01); *G06F 17/5054* (2013.01)

(58) Field of Classification Search
CPC .. G06F 17/5031; G06F 17/5054; G06F 17/11; G06F 17/5036
See application file for complete search history.

(56) References Cited

U.S. PATENT DOCUMENTS

| | | | | |
|---|---|---|---|---|
| 7,293,248 B2 * | 11/2007 | Chang | ................ | G06F 17/5031 716/108 |
| 8,046,724 B2 * | 10/2011 | Park | ..................... | G06F 17/505 716/108 |
| 8,086,988 B2 * | 12/2011 | Buck | ................... | G06F 17/5045 716/108 |
| 8,336,010 B1 * | 12/2012 | Chang | .................. | G06F 17/504 716/108 |
| 8,413,095 B1 * | 4/2013 | Dubuque | ............. | G06F 17/504 716/108 |
| 8,839,167 B1 * | 9/2014 | Dreibelbis | ......... | G06F 17/5031 716/108 |
| 2017/0262569 A1 * | 9/2017 | Huynh | ................ | G06F 17/5081 |

* cited by examiner

*Primary Examiner* — Naum B Levin
(74) *Attorney, Agent, or Firm* — LeRoy D. Maunu (57) ABSTRACT

Disclosed approaches for processing a circuit design targeted to a programmable integrated circuit (IC) include inputting the circuit design to a programmed processor. Each path of the circuit design specifies a plurality of circuit elements of the programmable IC. For each circuit element specified in a path of the plurality of paths the processor looks up in a memory a mean delay associated with the circuit element, looks up a sigma factor associated with the circuit element, and looks up a delta factor associated with the circuit element. The processor determines a delay of the path as a function of the mean delay, sigma factor, and delta factor of each circuit element in the path.

18 Claims, 5 Drawing Sheets

TIMING VERIFICATION IN A PROGRAMMABLE CIRCUIT DESIGN USING VARIATION FACTORS

TECHNICAL FIELD

The disclosure generally relates to determining delays of paths in a circuit design and implementing a circuit from the circuit design.

BACKGROUND

Designers analyze the timing of circuit designs in order to verify that a circuit implemented from the circuit design will operate as intended. Setup and hold time violations may be identified and paths of the circuit design adjusted accordingly. A critical path is generally recognized as any path that has a setup or hold time violation.

Static timing analysis (STA) uses timing models of circuit elements to determine delays of paths in the circuit design. The timing models associate delay values with circuit elements, and the delay of a path can be computed as the sum of the delay values of the circuit elements on the path. STA sometimes produces results that are too optimistic or overly pessimistic. If the STA results are too optimistic, a circuit path may violate timing constraints even though STA indicated the path is legal. If the STA results are too pessimistic, a circuit path may have enough slack to have supported a faster clock speed without violating timing constraints.

Statistical static timing analysis (SSTA) uses statistical models of circuit elements to improve the quality of timing analysis. Instead of using different delay values that are associated with different corners of a circuit element, the circuit element has associated statistical characterizations of delays.

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Approaches used in SSTA of ASIC circuit designs are impractical for application to circuit designs targeted to programmable ICs having FPGAs. FPGA timing models are abstracted timing models that may involve two transistors to hundreds of transistors and several stages of logic/custom circuits. In contrast, ASIC timing models describe individual cells in standard cell libraries. In addition, metal interconnect delay calculation for ASIC circuit designs is performed on-the-fly using several model order reduction techniques. However, in FPGAs, interconnect models are discrete, pre-calculated models and may contain many active elements.

SUMMARY

A disclosed method of processing a circuit design targeted to a programmable integrated circuit (IC) includes inputting a circuit design to a programmed processor. The circuit design includes a plurality of paths, and each path specifies respective instances of a plurality of circuit elements of the programmable IC. For each instance of a circuit element specified in a path of the plurality of paths the processor looks up in a memory a mean delay associated with the instance of the circuit element, looks up a sigma factor associated with the instance of the circuit element, and looks up a delta factor associated with the instance of the circuit element. Two or more different instances of a circuit element of the plurality of circuit elements have associated in the memory, different delta factors that are indicative of variability in delay between the two or more different instances. The processor determines a delay of the path as a function of the mean delay, sigma factor, and delta factor of each circuit element in the path.

A disclosed system includes a processor and a memory coupled to the processor. The memory is configured with instructions for processing a circuit design targeted to a programmable integrated circuit (IC). The instructions when executed by the processor cause the processor to input the circuit design. The circuit design includes a plurality of paths, and each path specifies respective instances of a plurality of circuit elements of the programmable IC. For each instance of a circuit element specified in a path of the plurality of paths, the processor looks up in the memory a mean delay associated with the instance of the circuit element, a sigma factor associated with the instance of the circuit element, and a delta factor associated with the instance of the circuit element. Two or more different instances of a circuit element of the plurality of circuit elements have associated in the memory, different delta factors that are indicative of variability in delay between the two or more different instances. The processor determines a delay of the path as a function of the mean delay, sigma factor, and delta factor of each circuit element in the path.

Other features will be recognized from consideration of the Detailed Description and Claims, which follow.

BRIEF DESCRIPTION OF THE DRAWINGS

Various aspects and features of the disclosed method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed systems and methods support SSTA of FPGA circuits through the use of variability-aware models of the FPGA circuit elements. Rather than relying on gate-level timing models as are used in SSTA of ASICs, SSTA of FPGA circuits uses variability-aware timing models constructed for FPGA circuit elements such as basic elements of logic (BELs), programmable interconnection points (PIPs), and nodes. BELs include flip-flops, multiplexers, and look-up tables (LUTs). Different types of nodes can have different delay factors in a variability-aware timing model. For example, the timing model for an FPGA having different types of nodes, which are signal lines of different lengths (e.g., single, double, quad, and long), can include different delay factors for the different types of nodes.

The variability-aware timing model used by an electronic design automation (EDA) tool includes delay factors for each FPGA circuit element that can be on a circuit path. The delay factors include mean delays, sigma factors, and delta factors. The mean delays, sigma factors, and delta factors can be established in a database through prior simulation and testing of the FPGA. A mean delay of a circuit element is the mean of delays determined for that circuit element. A sigma factor of a circuit element is the standard deviation of the delays determined for that circuit element. A delta factor of a circuit element is a variation factor determined for that circuit element based on a corner delay of the circuit element, the mean delay of the circuit element, the standard deviation of the delays determined for the circuit element, and factors based on margins applied in STA. The sigma factor covers transistor-level random variations in the circuit elements. However, there are many types of variations that are not covered by the sigma factor. Examples include systematic metal interconnect variations, proximity effect variations and spatial variations. The variations not covered by the sigma factor are covered by the delta factor.

The disclosed methods and systems process a circuit design targeted to a programmable IC, such as an FPGA. The circuit design includes a plurality of paths, and each path specifies a plurality of circuit elements of the programmable IC. An EDA tool executing on a processor computes the delays the paths using the mean delays, sigma factors, and delta factors that are associated with circuit elements on the paths.

Rather than using gate-level statistical delay factors as in SSTA of ASICs, the disclosed methods and systems use statistical delay factors that have been established for FPGA circuit elements, such as BELs, PIPs, and nodes, which may include many transistors and gates. In addition, variation factors that have been established for the circuit elements are combined with the statistical delay factors to provide further detail to assessment of the path delays.

In determining the delay of a path, for each circuit element in the path the mean delay, sigma factor, and variation factor are read from a database. The EDA tool computes the delay of the path as a function of the mean delay, sigma factor, and delta factor of each circuit element in the path. Once timing constraints are satisfied, the EDA tool generates configuration data and configures a programmable IC to implement a circuit according to the circuit design.

Figure 1:
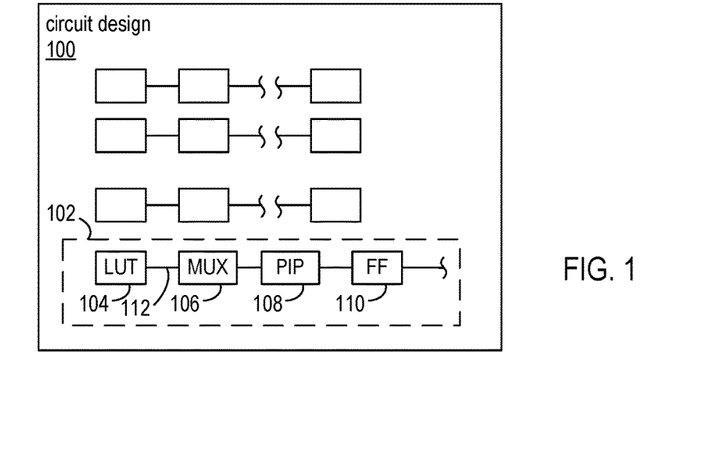
FIG. 1 shows examples of paths in a circuit design.

FIG. 1 shows examples of paths in a circuit design 100. Each block represents a circuit element in the path. Though only four paths are shown, those skilled in the art will recognize that circuit designs typically have hundreds to thousands of paths. Also, the paths of a circuit design are typically interconnected, though such interconnections are not shown in the paths of FIG. 1.

Past approaches for determining the delay of a path relied on models that indicated worst case delays for each of the different types of circuit elements. For example, in path 102 prior models had worst case delay values for the LUT 104, MUX 106, PIP 108, and flip-flop 110. The nodes/interconnects, such as node 112, between circuit elements also had worst case delay values. The disclosed methods and systems use statistical delay factors and variation factors associated with circuit elements to compute the delay of a circuit path.

Figure 2:
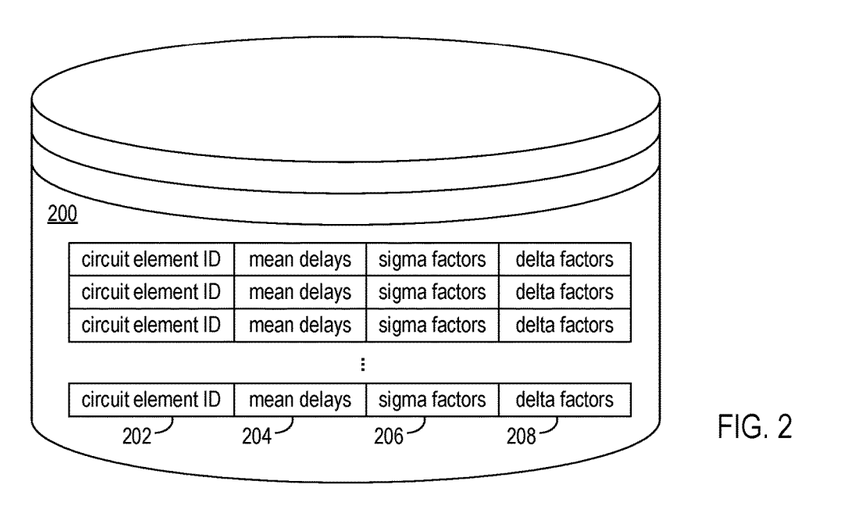
FIG. 2 shows a database having statistical delay factors and variation factors for different types of circuit elements.

FIG. 2 shows a database 200 having statistical delay factors and variation factors for different types of circuit elements. In computing the delays of paths in a circuit design, an EDA tool can read the statistical delay factors and variation factors from the database for circuit elements in the paths and accumulate the total delays of the paths.

Each circuit element available on a target programmable IC is identified by a circuit element identifier (ID) in the database 200, and respective sets of associated mean delays, sigma factors, and delta factors are associated with the circuit element IDs. For example, circuit element ID 202 has a set of associated mean delays 204, sigma factors 206, and delta factors 208. The circuit element IDs identify circuit elements such as flip-flops, multiplexers, lookup tables, programmable interconnection points, and nodes.

All instances of a particular circuit element have the same mean delay and sigma factor, and possibly different delta factors depending on the context of the circuit element. The delay of one instance of a circuit element may be different from the delay of another instance of the circuit element due to one of the instances being proximate another circuit structure of the programmable IC, such as a block RAM, or digital signal processing circuit. Also, the delay of one instance of a circuit element may be different from the delay of another instance of the circuit element due to the instances being disposed on different metal layers of the IC die and the different metal layers causing the instances to have different delays. Thus, different contexts of a particular circuit element can be identified with different circuit element IDs in the database 200.

The delta factors can be determined based on corner delay of a circuit element, a mean delay of delays of the circuit element, a standard deviation of delays of the circuit element, and factors based on margins applied in static timing analysis. In particular, the delta factor for instances of a circuit element identified by a particular circuit element ID is:

Delta factor=Delta1+Delta2 where:
Delta1=(Corner delay)−[(Mean delay)+3*(Sigma delay)];
Delta2=Factors based on margins applied in STA
examples of the factors based on margins include crosstalk effects, IR-drop effects, NBTI/PBTI effects and simulator inaccuracies;
Corner delay=the delay determined through simulation and testing of instances of the circuit element identified by the circuit element ID;
Mean delay=the mean of delays determined through simulation and testing of instances of the circuit element identified by the circuit element ID;
Sigma delay=the standard deviation of delays determined through simulation and testing of instances of the circuit element identified by the circuit element ID.

Figure 3:
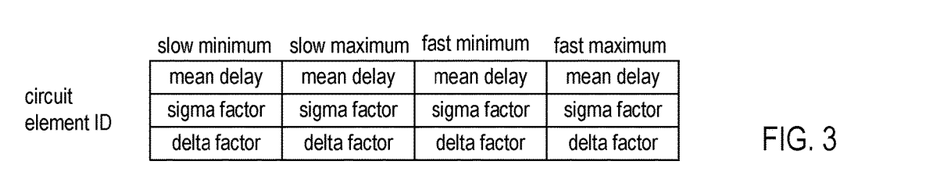
FIG. 3 shows a set of mean delays, sigma factors, and delta factors that are associated with a circuit element ID in the database of FIG. 2.

FIG. 3 shows a set of mean delays, sigma factors, and delta factors that are associated with a circuit element ID in the database 200 of FIG. 2. Each set includes different mean delays, sigma factors, and delta factors for a circuit element. A slow minimum group includes a mean delay, sigma factor, and delta factor determined for the circuit element; a slow maximum group includes a mean delay, sigma factor, and delta factor determined for the circuit element; a fast minimum group includes a mean delay, sigma factor, and delta factor determined for the circuit element; and a fast maximum group includes a mean delay, sigma factor, and delta factor determined for the circuit element.

Slow minimum is the minimum delay and slow maximum is the maximum delay in a slow process corner. Fast minimum is the minimum delay and fast maximum is the maximum delay in a fast process corner. Each process corner may also include different voltage and temperatures. In an example implementation, the slow minimum mean delay is the mean of the N least delays determined for the slow process corner, and the slow maximum delay is the mean of the N greatest delays determined for the slow process corner. Similarly, the fast minimum mean delay is the mean of the N least delays determined for the fast process corner, and the fast maximum delay is the N greatest delays determined for the fast process corner.

Figure 4:
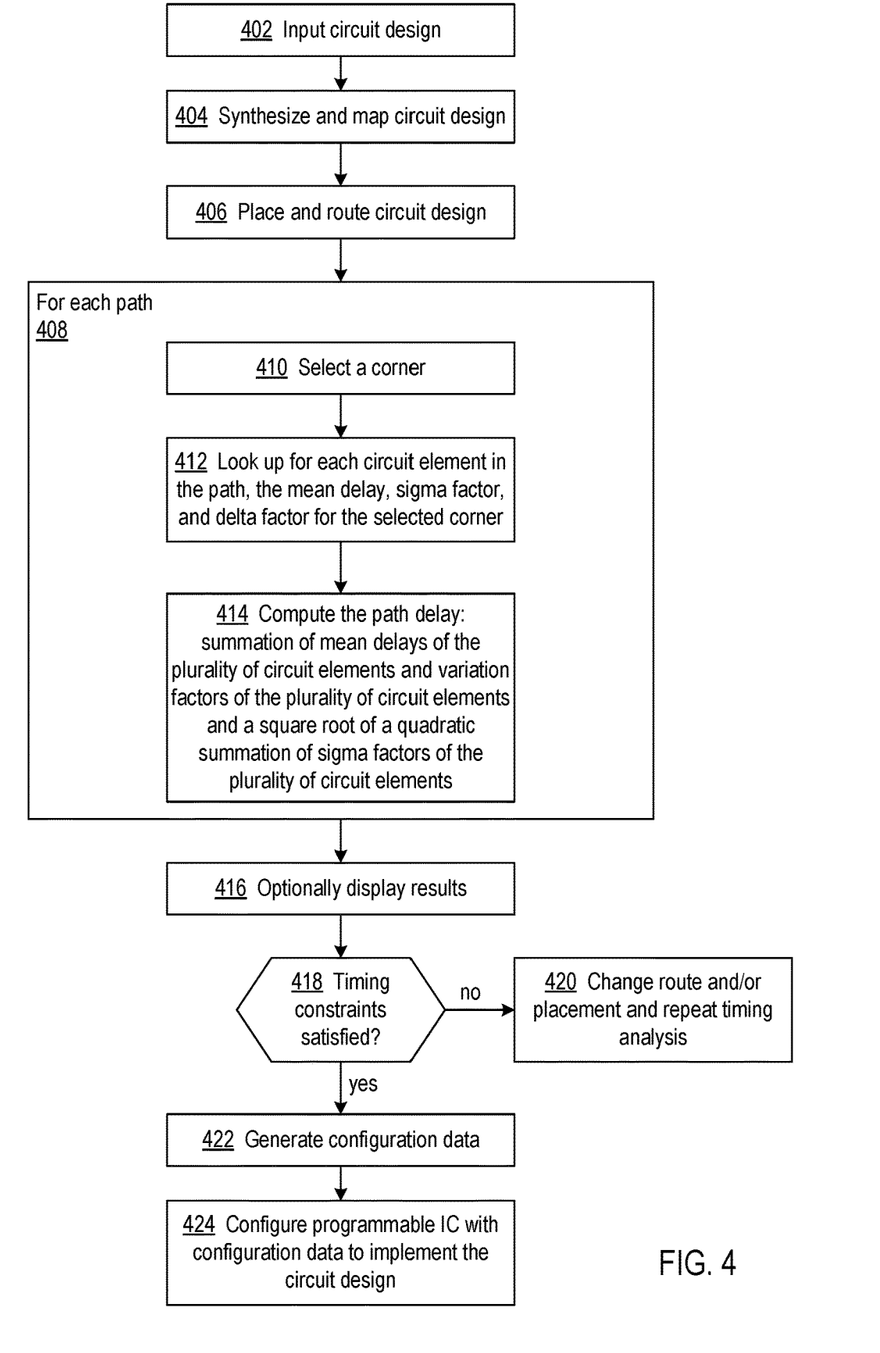
FIG. 4 shows a flowchart of a process of analyzing a circuit design using variability-aware STA models.

FIG. 4 shows a flowchart of a process of analyzing a circuit design using variability-aware STA models. An electronic design automation (EDA) tool executing on a processor inputs a circuit design at block 402. The EDA tool synthesizes the circuit design and maps the logic to programmable IC resources at block 404. Once synthesized and mapped, at block 406 the EDA tool commences placing and routing the circuit design.

During the place-and-route process, the EDA tool performs timing analysis at various stages, and in performing the timing analysis calculates delays for paths of the placed and routed circuit design. Block 408 shows an algorithm performed by the EDA tool to determine the delay for each path of the circuit design. At block 410, the EDA tool selects a corner for calculating the path delay. The corner can be one of slow minimum, slow maximum, fast minimum, and fast maximum and can be specified by the circuit designer operating the EDA tool in order to achieve a desired level of performance.

At block 412, the EDA tool looks up the delay factors for each circuit element in the path according to the selected corner. For each circuit element, the EDA tool reads for the selected corner the mean delay, sigma factor, and delta factor associated with the circuit element ID of the circuit element. For example, if the selected corner is fast minimum and the circuit element is a particular multiplexer, the EDA tool reads the fast minimum corner mean delay, sigma factor, and delta factor associated with the circuit element ID of the multiplexer.

The EDA tool computes the delay of the path as a function of the mean delays, sigma factors, and delta factors of the circuit elements in the path at block 414. The function used to compute the path delay is a summation of mean delays of the plurality of circuit elements and variation factors of the plurality of circuit elements and a square root of a quadratic summation of sigma factors of the plurality of circuit elements. In particular, the path delay can be computed as:

$$\text{path delay} = \sum_{i=1}^{n}\left(Dmean(i) + \delta(i) + \sqrt{\sum_{i}^{n}\sigma^2(i)}\right)$$

where:
i is the $i^{th}$ circuit element in the path having n circuit elements;
Dmean(i) is the mean delay associated with the circuit element ID that identifies circuit element i;
δ(i) is the variation factor associated with the circuit element ID that identifies circuit element i;
σ(i) is the sigma factor associated with the circuit element ID that identifies the circuit element i.

At block 416, the EDA tool can optionally output results of the timing analysis, including variability components, to a display screen, printer, or memory. The timing report below shows mean delays and sigma factors and delta factors having 0 values.

An example of output from the EDA tool can be as follows:
Source: CORE/D0/AND2_R/O (internal pin)
Destination: CORE/D0/AND2_R/I1
Path Group: (none)
Path Type: Max at Slow Process Corner
Data Path Delay: 0.306[0.293+/−0.004] ns (logic 0.083 [0.083+/−0.000] ns (27.124%) route 0.223[0.210+/−0.004] ns (72.876%))
Logic Levels: 0
Location: SLICE_X53Y184
Delay type: LUT2
net (fo=2, routed)
Incr(ns): 0.000[0.000+/−0.000]
 0.223[0.210+/−0.004]
Path(ns): 0.000[0.000+/−0.000]
 0.223[0.210+/−0.004]
Netlist Resource(s): r CORE/D0/AND2_R/O
 CORE/D0/RO_NET1
Location: SLICE_X53Y184
Delay type: LUT2
Incr(ns):
Path(ns):
Netlist Resource(s): r CORE/D0/AND2_R/I1
Location: SLICE_X53Y184
Delay type: LUT2 (Prop_A6LUT_SLICEM_I1_O)
Incr(ns): 0.083[0.083+/−0.000]
Path(ns): 0.306[0.293+/−0.004]
Netlist Resource(s): r CORE/D0/AND2_R/O At block 418, the EDA tool determines whether or not the placed and routed circuit design satisfies the designer-specified timing constraints. If the timing constraints are not satisfied, at block 420 the EDA tool changes the routing and/or placement of circuit elements and repeats the timing analysis of block 408. Otherwise, the EDA tool can continue with further processing of the circuit design at block 422.

At block 422, configuration data is generated from the placed-and-routed circuit design. For example, bitstream generation tools may be executed on a processor to generate configuration data for a programmable IC having a field programmable gate array (FPGA). At block 424, a programmable IC may be configured with the configuration data, thereby creating clock trees in a circuit that operates according to the circuit design.

Figure 5:
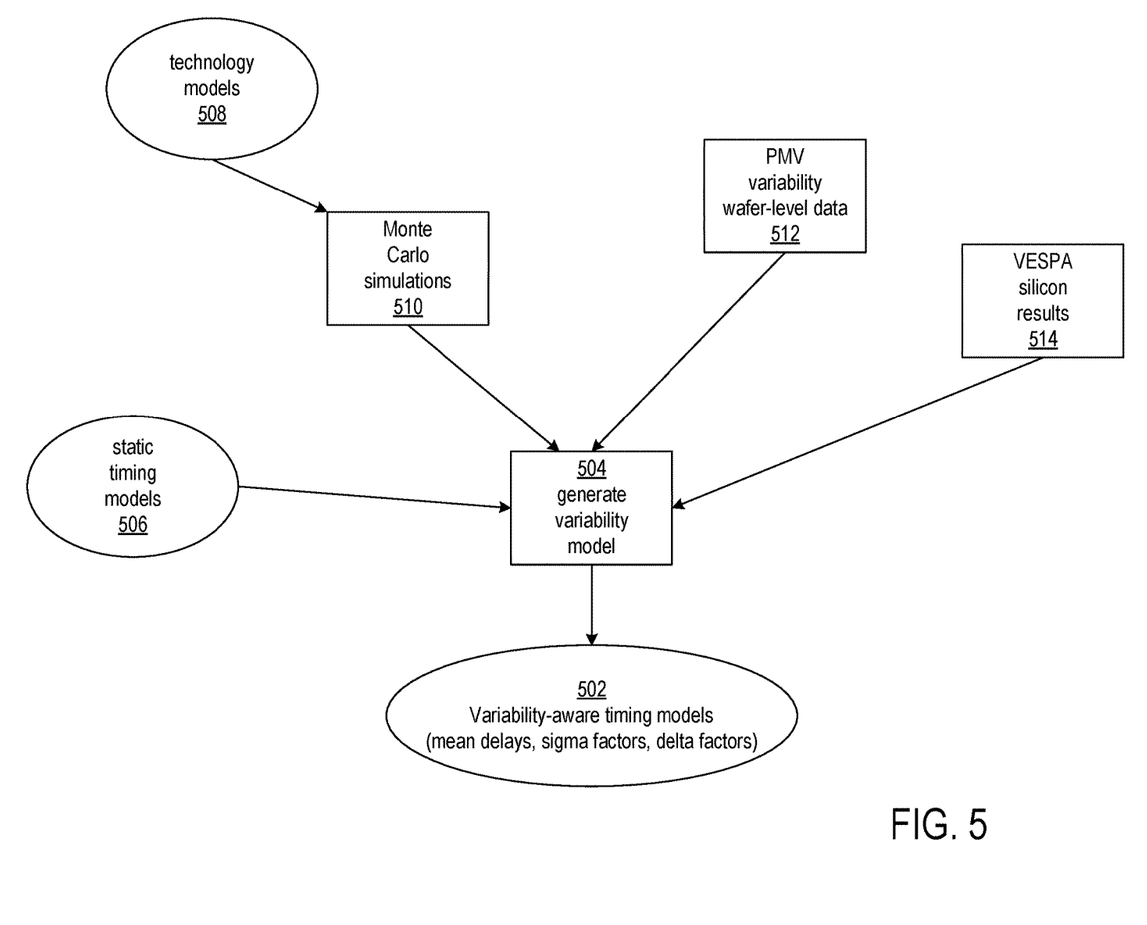
FIG. 5 shows a flow diagram that describes the generation of variability-aware timing models for a programmable IC.

FIG. 5 shows a flow diagram that describes the generation of variability-aware timing models 502 for a programmable IC. The variability-aware timing models include groups of mean delays, sigma factors, and delta factors, such as those shown in FIG. 2, for circuit elements of a programmable IC. The processes of FIG. 5 are performed prior to making a programmable IC generally available for implementation of circuit designs. The data used in generating the variability-aware timing models can be assembled through a combination of simulation and testing of physical programmable ICs at different process corners.

The process block 504, the algorithms of which can be implemented on a computer system, generates the variability-aware timing models by comparing corner speed models, Monte Carlo Simulation results, PMV and wafer-level data, and versatile and efficient speed parametric analytics (VESPA) silicon results to determine the mean delays, sigma factors and delta factors for variability speed models.

The static timing models 506 are corner speed models that contain delay values for circuit elements for different corners. The technology models 508 are models from foundry that contain basic variation and corner models. The Monte Carlo simulations block 510 generates and outputs detailed distributions for local variation effects for various speed parameters. The process block 504 derives mean delays and sigma factors for local variations based on the data from the Monte Carlo simulations.

The PMV variability wafer-level data 512 indicate variability of basic transistor and metal interconnect over a period of time. The PMV variability wafer-level data can be generated by basic AC and DC test circuits to measure key characteristics of transistors and metal interconnect. VESPA silicon results 514 have detailed statistical distributions for speed parameters from silicon.

Figure 6:
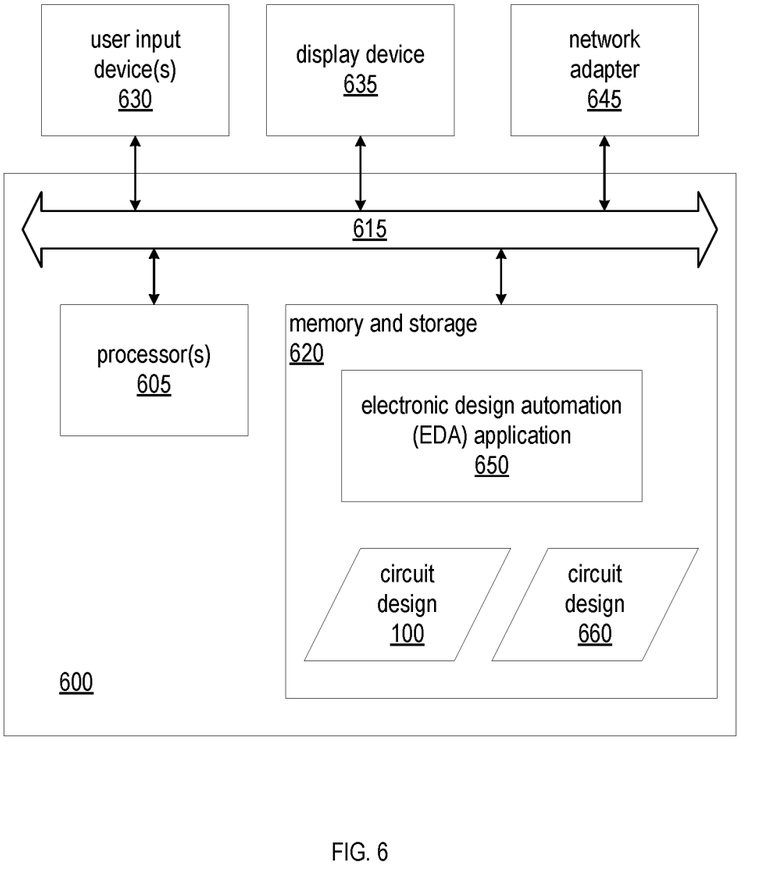
FIG. 6 is a block diagram illustrating an exemplary data processing system (system)

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 100 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650, receives and operates on circuit design 100. In one aspect, system 600 performs a design flow on circuit design 100, and the design flow may include synthesis, mapping, placement, routing, and the application of one or more physical optimization techniques as described herein. System 600 generates an optimized, or modified, version of circuit design 100 as circuit design 660.

EDA application 650, circuit design 100, circuit design 660, and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

Figure 7:
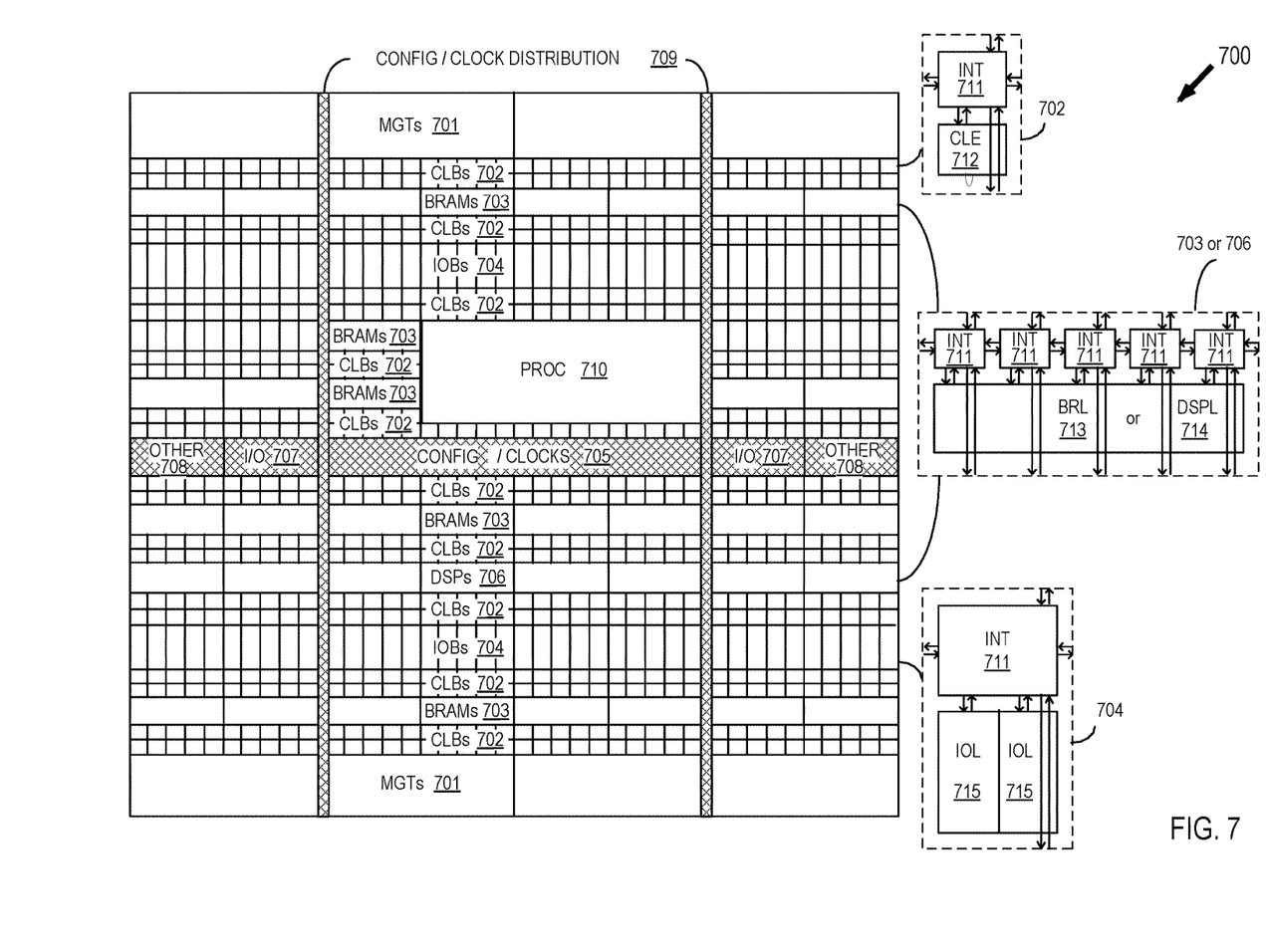
FIG. 7 shows a programmable integrated circuit (IC) on which the disclosed circuits and processes may be implemented.

FIG. 7 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for timing analysis of circuit designs. Other aspects and features will be apparent to those skilled in the art from consideration of the specification. It is intended that the specification and drawings be considered as examples only, with a true scope of the invention being indicated by the following claims.

What is claimed is:

1. A method of processing a circuit design targeted to a programmable integrated circuit (IC), comprising:
inputting a circuit design to a programmed processor, wherein the circuit design includes a plurality of paths, and each path specifies respective instances of a plurality of circuit elements of the programmable IC;
for each instance of a circuit element specified in a path of the plurality of paths,
looking up a mean delay associated with the instance of the circuit element in a memory,
looking up a sigma factor associated with the instance of the circuit element in the memory, and
looking up a delta factor associated with the instance of the circuit element in the memory, wherein two or more different instances of a circuit element of the plurality of circuit elements have associated in the memory, different delta factors that are indicative of variability in delay between the two or more different instances;
determining by the programmed processor a delay of the path as a function of the mean delay, sigma factor, and delta factor of each circuit element in the path;
generating configuration data from the circuit design in response to the delay satisfying a timing constraint; and
configuring the programmable IC with the configuration data to implement a circuit according to the circuit design.

2. The method of claim 1, wherein the instances of circuit elements specified in the path include at least one of a flip-flop, a multiplexer, or a look-up table.

3. The method of claim 2, wherein the instances of circuit elements specified in the path include at least one of a programmable interconnection circuit or a node.

4. The method of claim 1, further comprising generating variability-aware timing models that identify instances of circuit elements and associate mean delays, sigma factors, and delta factors with the identified instances of the circuit elements.

5. The method of claim 4, wherein the generating the variability-aware timing models includes:
executing a Monte Carlo simulation on technology models; and
combining Monte Carlo simulation output data with variability wafer-level data, static timing models, and versatile and efficient speed parametric analytics silicon results.

6. The method of claim 1, wherein:
the looking up the mean delay associated with the instance of the circuit element in a memory includes selecting the mean delay from a plurality of mean delays associated with the instance of the circuit element;
the looking up the sigma factor associated with the instance of the circuit element in the memory includes selecting the sigma factor from a plurality of sigma factors associated with the instance of the circuit element; and
the looking up the delta factor associated with the instance of the circuit element in the memory includes selecting the delta factor from a plurality of delta factors associated with the instance of the circuit element.

7. The method of claim 6, wherein:
the plurality of mean delays associated with the instance of the circuit element include mean delays for a plurality of corners, respectively;
the plurality of sigma factors associated with the instance of the circuit element include sigma factors for the plurality of corners, respectively; and
the plurality of delta factors associated with the instance of the circuit element include delta factors for the plurality of corners, respectively.

8. The method of claim 1, wherein the function of the mean delay, sigma factor, and delta factor of each instance of each circuit element in the path is a summation of mean delays of the respective instances of the plurality of circuit elements and delta factors of the respective instances of the plurality of circuit elements and a square root of a quadratic summation of sigma factors of the respective instances of the plurality of circuit elements.

9. The method of claim 1, further comprising outputting to a display device the delay of the path, mean delays of the plurality of circuit elements, and a variability component.

10. The method of claim 1, wherein each delta factor is a function of a corner delay of instances of a circuit element, a mean delay of delays of instances of the circuit element, and a standard deviation of delays of instances of the circuit element.

11. A system comprising:
a processor;
a memory coupled to the processor, wherein the memory is configured with instructions for processing a circuit design targeted to a programmable integrated circuit (IC), and the instructions when executed by the processor cause the processor to perform operations including:
inputting the circuit design, wherein the circuit design includes a plurality of paths, and each path specifies respective instances of a plurality of circuit elements of the programmable IC;
for each instance of a circuit element specified in a path of the plurality of paths,
looking up a mean delay associated with the instance of the circuit element in the memory,
looking up a sigma factor associated with the instance of the circuit element in the memory, and
looking up a delta factor associated with the instance of the circuit element in the memory;
determining a delay of the path as a function of the mean delay, sigma factor, and delta factor of each circuit element in the path;
generating configuration data from the circuit design in response to the delay satisfying a timing constraint; and
configuring the programmable IC with the configuration data to implement a circuit according to the circuit design.

12. The system of claim 11, wherein the instances of the circuit elements specified in the path include at least one of a flip-flop, a multiplexer, or a look-up table.

13. The system of claim 12, wherein the instances of the circuit elements specified in the path include at least one of a programmable interconnection circuit or a node.

14. The system of claim 11, wherein:
the instructions for looking up the mean delay associated with the instance of the circuit element in a memory include instructions for selecting the mean delay from a plurality of mean delays associated with the instance of the circuit element;
the instructions for looking up the sigma factor associated with the instance of the circuit element in the memory include instructions for selecting the sigma factor from a plurality of sigma factors associated with the instance of the circuit element; and
the instructions for looking up the delta factor associated with the instance of the circuit element in the memory include instructions for selecting the delta factor from a plurality of delta factors associated with the instance of the circuit element.

15. The system of claim 14, wherein:
the plurality of mean delays associated with the instance of the circuit element include mean delays for a plurality of corners, respectively;
the plurality of sigma factors associated with the instance of the circuit element include sigma factors for the plurality of corners, respectively; and
the plurality of delta factors associated with the instance of the circuit element include delta factors for the plurality of corners, respectively.

16. The system of claim 11, wherein the function of the mean delay, sigma factor, and delta factor of each instance of each circuit element in the path is a summation of mean delays of the respective instances of the plurality of circuit elements and delta factors of the respective instances of the plurality of circuit elements and a square root of a quadratic summation of sigma factors of the respective instances of the plurality of circuit elements.

17. The system of claim 11, wherein the memory is further configured with instructions that when executed by the processor cause the processor to output to a display device the delay of the path, mean delays of the plurality of circuit elements, and a variability component.

18. The system of claim 11, wherein each delta factor is a function of a corner delay of instances of a circuit element, a mean delay of delays of the instances of the circuit element, and a standard deviation of delays of the instances of the circuit element.

* * * * *